Patented Oct. 27, 1936

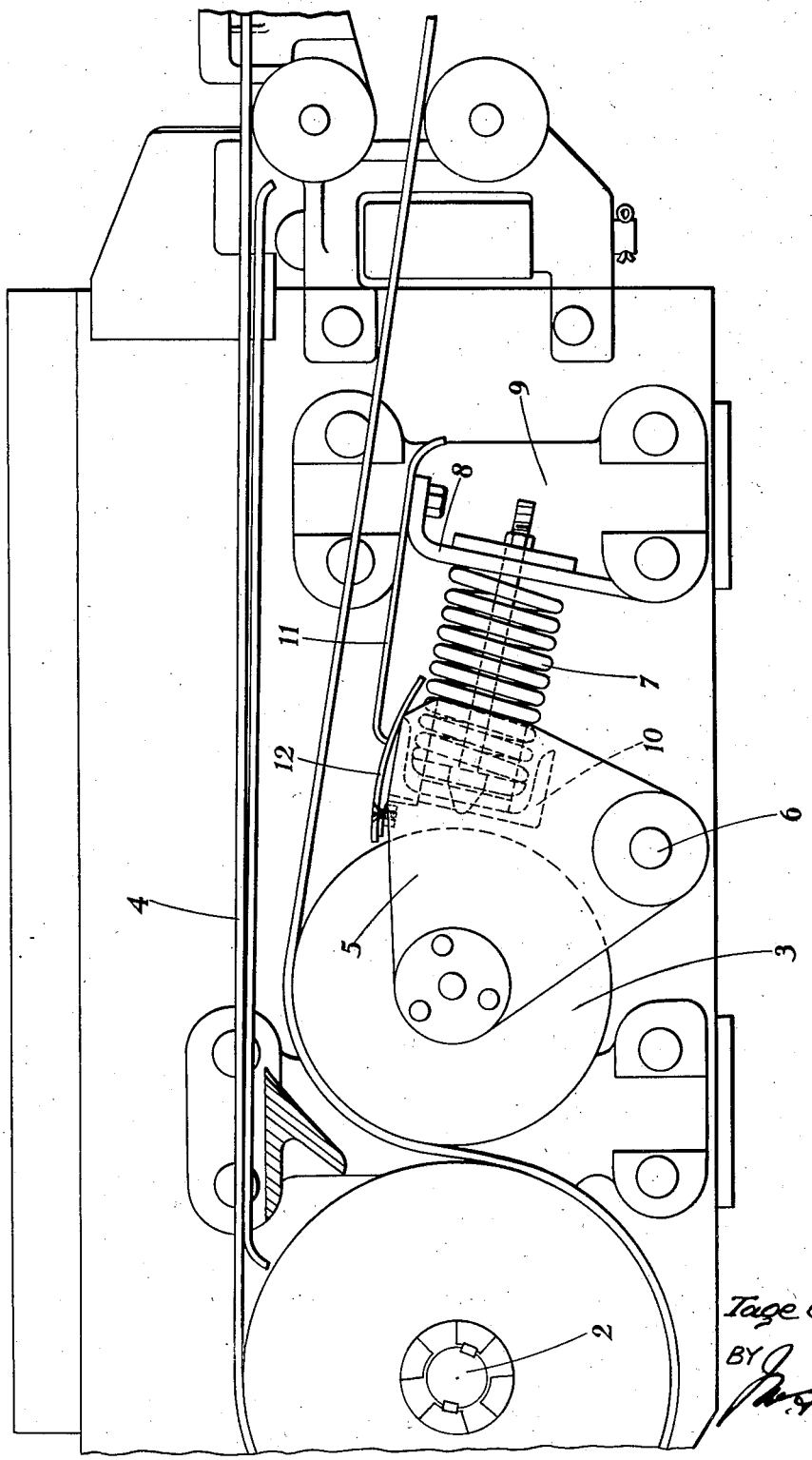

2,058,617

UNITED STATES PATENT OFFICE 2,058,617

BELT DRIVE

Tage Georg Nyborg, Worcester, England, assignor of one-half to The Mining Engineering Company Limited, Worcester, England Application October 29, 1935, Serial No. 47,315
In Great Britain November 17, 1934

5 Claims. (Cl. 74—242.15)

This invention relates to belt drives and is more especially intended for application to belt conveyors wherein an endless belt is employed passing over drums or pulleys one or more of which is adapted to drive the belt.

Spring pressed jockey pulleys have been successfully used to squeeze a belt between their surfaces and the surfaces of driving drums or pulleys thus driving with a kind of mangle action and these so-called mangle rollers have been employed to cooperate with the slack or return run of the belt so that a considerable arc of frictional contact can also be used with the belt subject to the driving tension. The return run of the belt is usually under little or no tension, but if tension is applied to it for some reason, this has the effect of tending to pull the jockey pulley away from the driving drum and the actual mangle action is no longer present.

It is an object of the invention to provide a belt drive including a spring-pressed mangle roller the resultant force upon which due to tension in the belt is substantially balanced by a reaction acting along a line situated in the plane in which the resultant force acts or intersects that plane at the axis of the mangle roller at not more than 25°.

It is a further object of the invention to provide a belt drive including a spring-pressed mangle roller which is mounted for pivotal movement about a point situated in a plane which coincides with the plane in which acts the resultant force upon the roller due to tension in the belt or intersects that plane at the axis of the mangle roller at not more than 25°.

With these and other objects in view, the invention consists in the improved combinations and arrangements contained in the embodiment now to be described in detail the novel features of which are set out in the claims which follow.

The drawing shows a driving unit in side elevation, one side plate of the driving head frame and parts connected thereto being omitted.

The driving unit includes a driving drum 1 mounted on a shaft 2 borne in bearings carried by the side plates forming the frame of the driving head, and a mangle roller 3 adapted to press the return, or slack run of the belt 4 into contact with the surface of the driving drum. As shown, the mangle roller is so arranged as to cause the belt to be in contact with the surface of the driving drum through an angle of approximately 280°.

The mangle roller is journalled at each end in one corner of a triangular plate 5, another corner of which is pivoted to the frame, as at 6, at a point lying substantially in the plane in which the resultant force upon the roller due to tension in the belt acts, that is a line bisecting the angle between the tangents to the roller 3 formed by the belt at the points of coming into and leaving contact with its surface.

The mangle roller is pressed towards the surface of the driving drum by means of a coil spring or springs 7 confined between a member 8 spanning between brackets 9 secured to opposite sides of the frame and a member 10 connected at each end to the two triangular plates near the third corners thereof.

Since the supports of the mangle roller are pivoted substantially in the plane of the resultant force due to tension in the belt, this force is prevented from interfering with the action of the spring in producing the desired pressure of the belt upon the driving drum. Belt conveyors are often required to drive uphill or downhill: and the weight of the return run of the belt affects the tension in that run while a certain tension at the end remote from the drive is necessary if the load is not to cause undue sagging: it is also sometimes desirable to drive the belt temporarily in the reverse direction when a certain tension in the idle run at once becomes essential. Under various practical conditions therefore the tension in this run might become sufficient to pull the mangle roller away from the driving drum and destroy the drive if precautions were not taken to prevent this. It is seen therefore that the invention provides a driving unit employing a spring-pressed mangle roller the strength of the spring of which may be calculated to give the correct pressure, since it does not have to be capable of resisting forces due to abnormal tension in the belt, these being substantially balanced by the reaction at the pivots 6 lying in or near the plane in which those forces act.

In order to keep the return run of the belt at all times out of contact with the spring or springs and to protect the latter from falling dirt, a plate 11 with downwardly curved forward and rearward edges is secured to the member 8; a plate 12 covering the end of the spring is also secured between the triangular pivoted plates 5, and is curved on such a radius as to maintain light contact with the downwardly turned forward edge of the stationary plate 11 when the triangular supports rock about their pivots.

The pivoted point of the frame or the like supporting the mangle roller need not lie exactly in the plane bisecting the angle between the tangents formed by the belt, but must be so close to this plane that the turning moment caused by any expected abnormal tension in the belt is not sufficient to interfere with the spring action. In practice it is found that the pivotal point must be so situated that the plane containing it and passing through the axis of the mangle roller does not intersect the plane of the resultant force at an angle greater than 25°.

The triangular plates described above to form the pivoting frame for the mangle roller are convenient to manufacture, but other forms of support may of course be employed if desired: the triangular support is the equivalent for this purpose of a bell crank lever, for example, and such a lever may take its place. Plain pivoted links or levers may also be used, the spring or springs acting upon or near the ends in which the roller is borne or at the other side of the fulcrum.

Various modifications in the construction and arrangement of parts above described may, of course, be made, or other arrangements employed in which the resultant force on a spring-pressed mangle roller due to belt tension is balanced by a reaction acting along a line lying in the plane of that force or in a plane intersecting that plane at the centre of the mangle roller at not more than 25°, without departing from the invention.

I claim:—

1. A belt drive comprising a driving drum, a belt, a spring-pressed mangle roller adapted to squeeze said belt between its own surface and that of said driving drum, said mangle roller being mounted for pivotal movement about a point situated in a plane passing through the axis of said mangle roller and there intersecting, at not more than 25°, the plane in which acts the resultant force upon said mangle roller due to tension in said belt.

2. A belt drive comprising a driving drum, a belt, a spring-pressed mangle roller adapted to squeeze said belt between its own surface and that of said driving drum, and a member carrying said mangle roller and mounted for pivotal movement about a point situated substantially in the plane in which acts the resultant force upon said mangle roller due to tension in said belt.

3. A belt drive comprising a driving drum, a belt, a mangle roller, a spring adapted to press said mangle roller towards said driving drum, and means independent of said spring adapted substantially to balance the resultant force upon said mangle roller due to tension in said belt by means of a reaction acting along a line which passes through the axis of said mangle roller and there intersects, at not more than 25°, the plane in which the resultant force acts.

4. A belt drive comprising a driving drum, a mangle roller, a belt passing round said driving drum and said mangle roller, a member carrying said mangle roller and pivoted at a point situated substantially in the plane containing the line bisecting the angle subtended at the centre of said mangle roller by the points at which said belt begins and ends contact with the surface of said roller, and spring means acting upon said pivoted member to cause said mangle roller to squeeze said belt between its own surface and that of said driving drum.

5. A belt drive comprising a driving pulley, a mangle roller, a belt, a member carrying said mangle roller and pivoted at a point situated in a plane which passes through the axis of said mangle roller and there intersects, at not more than 25°, the plane in which acts the resultant force on said mangle roller due to tension in said belt, a spring acting upon said pivoted member to cause said mangle roller to squeeze said belt against said driving drum, a fixed plate, and a plate carried by said pivoted member adapted to cooperate with said fixed plate to shield said spring from said belt.

TAGE GEORG NYBORG.